Oct. 7, 1969
R. W. SARGENT
3,471,665
MAGNETIC REED FLOAT SWITCH FOR USE WITHIN THE INTERIOR OF
A LIQUID CONTAINER HAVING A REMOVABLE
INSTALLATION FEATURE
Filed May 26, 1967
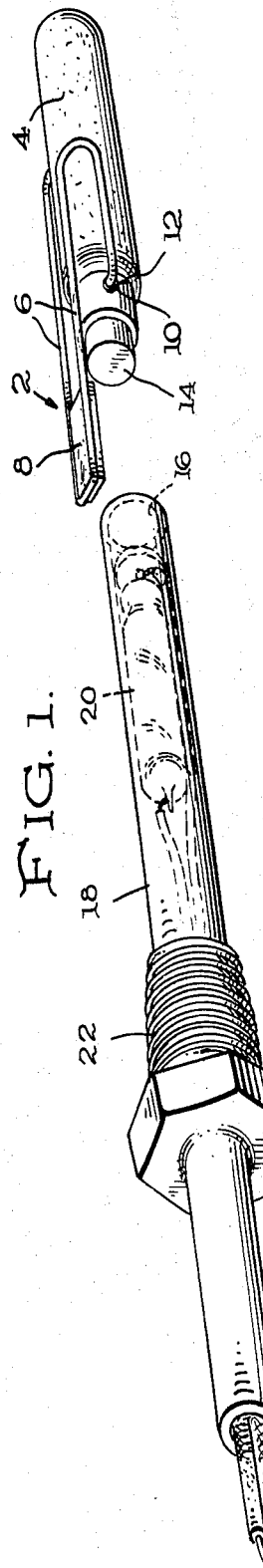
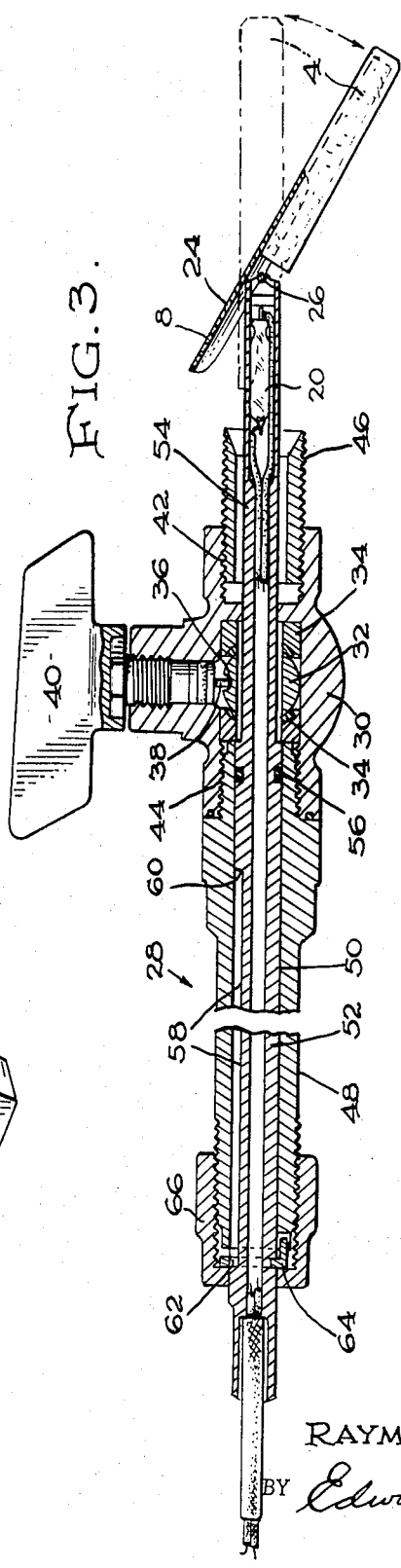
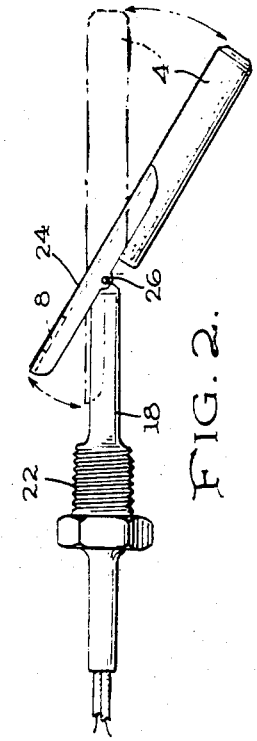
INVENTOR
RAYMOND SARGENT
BY Edwin E. Greigg
ATTORNEY

United States Patent Office 3,471,665
Patented Oct. 7, 1969

3,471,665
MAGNETIC REED FLOAT SWITCH FOR USE WITHIN THE INTERIOR OF A LIQUID CONTAINER HAVING A REMOVABLE INSTALLATION FEATURE
Raymond W. Sargent, Burlington, Vt., assignor to Simmonds Precision Products Inc., Tarrytown, N.Y., a corporation of New York
Filed May 26, 1967, Ser. No. 641,594
Int. Cl. H01h 35/18
U.S. Cl. 200—84                                    4 Claims

ABSTRACT OF THE DISCLOSURE

A float-type switch for use in a liquid container employing a magnetic reed switch and a pivotally mounted float member having a permanent magnet connected thereto for actuating the reed switch when positioned adjacent thereto in response to buoyant forces acting on the float member. The float switch is employed with a valve operated installation mounted on an outside wall of the liquid container which allows the float switch to be removed from the interior of the container regardless of the fill condition thereof.

---

This invention relates to circuit breakers, and, more particularly, to a float actuated switch for use in the interior of a liquid container and having a unique installment feature which allows the switch to be removed exteriorly from the container regardless of the amount of liquid therein.

According to one aspect of the float switch arrangement embodying the principles of this invention, there is provided an encapsulated magnetic reed-type switch secured to a suitable bracket which has pivotally mounted thereto a float member having substantially the same diametrical dimensions as the magnetic reed-type switch. A permanent magnet is supported by an axially extending member from the float and lies adjacent to the magnetic reed switch when the float is in a horizontal position due to the presence of liquid exerting a buoyant force thereon. In the absence of a liquid the float will swing downwardly about its pivot thus swinging the magnet upwardly and away from the reed switch. In addition, the float switch is supported in an elongated tubular housing having a valve member thereon. The entire device is fitted into an appropriate bushing in the wall of the container such that the float switch portion is positioned within the interior of the container and the valve member portion is positioned exteriorly of the container. If it is desired to remove the float switch for replacement or repairs, it is only necessary to loosen a holding nut, rotate an extension member of the switch until the float pivoted thereto assumes a horizontal position, withdraw the switch part way through the elongated housing, close the valve, and remove the entire switch from the housing. It will become apparent that the novel switch according to this invention affords numerous advantages, including simplicity of design and ease of handling. These advantages are significant when the float switch is utilized with closed containers or containers normally inaccessible except for a wall portion thereof.

Accordingly, it is an object of this invention to provide a float actuated switch of compact design, reliable operation, and having a minimum of parts.

It is a further object of this invention to provide a float actuated switch which makes novel employment of a magnetic reed-type switch.

It is yet a further object of this invention to provide an installation for the float switch according to this invention so that the switch may be inserted into, or removed from, any type of liquid container regardless of its fill condition.

Other objects and advantages will become apparent from a further study of the following disclosure and drawings in which:

FIG. 1 is a perspective view of the float-type switch according to this invention;

FIG. 2 is a perspective view of a modified design of the float-type switch according to this invention; and FIG. 3 is a partial cross-sectional view of the support housing in which the float type switch is mounted for use in a liquid container.

Referring now to FIG. 1 there is shown the float assembly 2, according to this invention, having float member 4 which may be molded from a plastic material or formed from a hollow metal material. A one piece wire formed member 6 is affixed to the outer surface of the float by a suitable adhesive such as epoxy or solder. The free ends of the wire member 6 are bent towards each other and engage a fluorocarbon plastic sleeve in the bushing member 12. These engaging members extend beyond the end of the float a sufficient distance to allow the float 4 to pivot about the bushing 12. A permanent magnet 8 is supported between the axially extending parallel wires of member 6 and is affixed thereto by a suitable adhesive such as epoxy or joined by solder. The bushing 12 has a step-down extension 14 which is adapted to fit snugly within a recess 16 forming one end of a hollow cylindrical housing 18. Inside the housing 18 and adjacent the recess 16 there is positioned a magnetic reed switch 20 of conventional design, such as that described in U.S. Patent No. 3,247,343, issued to R. H. Van Wagner et al. and U.S. Patent No. 3,307,126, issued to R. E. Show et al. The housing 18 can be fitted to a suitable holding nut 22, as shown, for securing to the wall of a liquid container. The housing 18 can be made from an austenitic stainless steel material or a non-ferrous non-magnetic metal material unaffected by the magnetic field emanating from the magnet 8 when it is in the vicinity of the housing 18.

FIG. 2 shows a further embodiment in which the wire member 6 has been replaced with a channel-shaped member 24. The center portion of member 24 is provided with suitable recesses 26 which are aligned with the sleeve 10 in the bushing 12. A suitable pin means, not shown, extending through the recesses 10, 26 provides the necessary pivotal support for the member 24. The magnet 8 is secured to the underface of one end of the member 24 while the float 4 is secured to the underface of the other end, with the float 4 and the member 24 having substantially the same radius of curvature. This construction is simple and economical in that the channel member 24 can be easily stamped from a suitable sheet material. However, this embodiment may be subjected to the effects of the surface tension of liquid between the permanent magnet 8 and the housing 18, as will be explained more fully below.

In operation the float switch is affixed to one of the walls of a tank containing a liquid by means of the holding nut 22. If the float 4 is not in contact with the liquid, it will depend downwardly about the bushing 12 causing the magnet 8 to be located above the housing 18 containing the magnetic reed switch. When liquid approaches the vicinity of the switch, the float will rise therewith causing the magnet to approach housing 18 and the magnetic reed switch. When the float is nearly horizontal, the magnet will be almost touching the housing 18 and at this point a circuit is closed according to the normal function of the reed switch 20. This circuit can then be utilized for indicating or other purposes which may be desired. It is to be understood that the magnet 8 need not touch the housing 18 to close the circuit in the magnetic reed switch, rather it has only to come within close approximation thereof such as to exert the influence of its magnetic field on the reed switch 20.

It is conceivable that once the liquid level subsides, the surface tension of the small amount of liquid remaining between the magnet 8 and the housing 18 will act as a restraining force against the downward swing of the float. In the FIG. 1 embodiment of the float switch, this force is almost negligible by virtue of the wing-form wire structure which offers a minimum amount of surface area in the vicinity of the magnet. The FIG. 2 embodiment, however, because of the relatively large surface area offered by the channel member 24, is characterized by a larger restraining force due to this surface tension, and, in this particular case, the float 4 may be advantageously made of a heavier material or suitably weighted so as to overcome the restraining force of such surface tension.

In FIG. 3 there is shown a valve operated support housing 28 for the float switch 2 according to this invention. The housing 28 consists of a valve seat 30 for supporting an apertured ball valve 32 between a pair of Teflon valve seat members 34. The ball valve 32 is provided with a groove 36 for receiving a tongue member 38 depending from the screw-threaded shaft of a handle member 40. Thus, by rotating the handle the position of the aperture within the ball valve can be changed to either an open or closed position. Suitable stops may be provided on the handle 40 for indicating a completely closed position and a completely open position. The valve seat is provided with aligned screw-threaded apertures 42, 44 for receiving respectively the cylindrical extension members 46, 48. With the apertured ball valve 32 in its open position, the valve seat portion 30, together with its extension members 46, 48, forms a hollow cylindircal channel 50 for receiving an elongated tube member 52. With the float switch 2 attached to the forward end of the tube member 52 in the same manner as described with respect to the housing 18 above, the entire assembly can be passed through the channel 50 when the float 4 is in a horizontal position, that is, coaxially aligned with the tube 52. For this purpose, the outside diameter of the float 4 will be slightly smaller than the inside diameter of the channel 50. It is also necessary that the forward portion 54 of the tube 52 passing through the apertured ball valve 32 be of a reduced diameter in order to accommodate the thickness of the magnet 8 and its support member when it is lying adjacent to the tube 52, as shown in dotted lines. It will be understood that the outside diameter of the tube 52 as represented by the medial portion thereof will be slightly smaller than the diameter of the channel 50 in order to facilitate a sliding engagement between the two. An O-ring seal 56 is provided on the medial portion of the tube 52 to ensure a sealing engagement between the channel 50 and the tube 52. The tube 52 is further provided with a flat portion 58 which extends rearwardly from the abutment surface 60 defined thereby to just beyond the edge of the member 48 where a circumferential slot 62 is provided and fitted with a suitable key member 64. Upon loosening a suitable holding nut 66 screw-threaded on the end of member 48, the tube 52 can be rotated to bring the key member 64 into engagement with the flat portion 58. In this position the tube 52 can be withdrawn rearwardly, the key member 64 riding on the flat portion 58.

The operation of the device according to FIG. 3 is as follows. Assuming that the float switch 2 is installed and it is desired to remove it, it is then only necessary to loosen the holding nut 66 on the rear of the extension member 48. This will allow the tube member 52 to be rotated so that the flat portion 58 thereof can be positioned adjacent the key member 64. However, before withdrawing the tube 52, it must be ascertained whether the float member 4 is in a horizontal position, that is, coaxially aligned with the tube 52 so that it may be withdrawn through the channel 50. Naturally, if the container of fluid is full, this condition will exist, but if the container is empty, the float 4 will be in a depending position and will thus offer resistance when the channel member 24, for example, abuts against the chamfered throat of the member 46 when the tube 52 is pulled rearwardly. When this resistance is encountered, it will be necessary to rotate the tube 52 until the magnet 8 is directly below the magnetic reed switch 20 in the forward portion 54 of the tube 52. In this position the float 4 will assume a horizontal position as defined by the abutment of the magnet 8 against the underside of the forward portion 54. This condition will manifest itself when after one or two rotations of the tube 52 upon slight rearward movement, no resistance is encountered. However, to facilitate this condition, the chamfered opening of member 46 will serve to guide the channel member 24, for example, into a horizontal position if the latter is still somewhat askew. The tube 52 is then pulled rearwardly through the channel 50 and the apertured valve 32 with the key member 64 riding along the flat portion 58 until the key engages the abutment face 60. In this position the switch 2 will be to the rear of the ball valve 32 within the channel 50 and the O-ring 56 will act as a seal against fluid entering the empty portion of the channel 50 through member 46. At this time the ball valve 32 is rotated by means of a handle 40 to a closed position, that is, the aperture through the ball valve is now at 90° with the axis of the channel 50. The holding nut 66 is then completely removed from the end of the member 48 and the tube 52 can then be completely withdrawn for purposes of repair, replacement or the like.

When installing the float switch 2, the same operating procedure, as above-described, is observed in reverse. The float switch 2 is inserted into the channel 50, the ball valve 32 is rotated to an open position and the tube 52 is then pushed further along the channel 50 with the key 64 riding on the flat portion 58 until it engages the circumferential slot 62. The holding nut is then tightened after the float switch 2 is rotated to its operating position. Suitable markings on the tube 52 adjacent the holding nut 66 may be provided to enable one to determine the operating position of the float switch, that is, the position in which the float 4 will pivot in a vertical plane. It is also to be understood that the member 46 will serve as a means for securing the device to the wall of a container of liquid in the same manner that the holding nut 22 functions for the float switch shown in FIG. 1.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. An installation for a liquid level sensing device for use within the interior of a container comprising the combination of a generally elongated open-ended hollow housing positioned on a wall of said container and communicating with the interior thereof, means for sensing the liquid level within said container, said sensing means slidably mounted within said housing and extending within the interior of said container, said sensing means further having a sealing means engaging the interior surface of said housing, and valve means positioned on said housing for closing said housing when said sensing device is removed from said housing.

2. An installation for a liquid level sensing device for use within the interior of a container comprising the combination of a generally elongated open-ended hollow housing positioned on a wall of said container and communicating with the interior thereof, means for sensing the liquid level within said container, said sensing means slidably mounted within said housing to an extended position within the interior of said housing, locking means for maintaining said sensing means in said extended position, a valve means defining an open and closed condition for said housing, said sensing device extending through said valve means when in its open condition and sealing means surrounding said sensing device for engaging the interior surface of said housing.

3. An installation for a float-type switch for use within the interior of a liquid container comprising the combination of a generally elongated open-ended hollow housing positioned on a wall of said container and communicating with the interior thereof, an elongated support means connected to said float-type switch and slidably mounted within said housing for extending said switch into the interior of said container, a valve means defining an open and a closed condition in said housing, said support means extending through said valve means when in said open condition, means for releasably locking said support means within said housing and sealing means surrounding said support means for engaging the interior surface of said housing.

4. An installation for a liquid level sensing device for use within the interior of a container comprising the combination of a generally elongated open-ended housing positioned on a wall of said container and communicating with the interior thereof, valve means positioned within said housing defining an open and closed condition, means for sensing the liquid level within said container, a support means for said sensing means slidably mounted in said housing and extending through said valve means when in its open condition for extending said sensing means into the interior of said container, releasable locking means for said support means for allowing said support means to be removed from said housing and said valve means, and manual means for closing said valve.

References Cited
UNITED STATES PATENTS

| | | | |
|---|---|---|---|
| 1,191,013 | 7/1916 | McGilvray | 137—323 X |
| 2,207,898 | 7/1940 | Schoenecke | 137—320 X |
| 2,577,165 | 12/1951 | Thorsheim. | |
| 2,600,309 | 6/1952 | McDonald et al. | |
| 2,927,176 | 3/1960 | Auld et al. | |
| 3,260,820 | 7/1966 | O'Brien. | |
| 3,322,917 | 5/1967 | Furlow. | |

ROBERT K. SCHAEFER, Primary Examiner

D. SMITH, Assistant Examiner

U.S. Cl. X.R.
137—320; 335—205